Jan. 14, 1930.  C. BROT  1,743,595
ILLUMINATED MIRROR AND SUPPORT THEREFOR
Filed Nov. 30, 1928
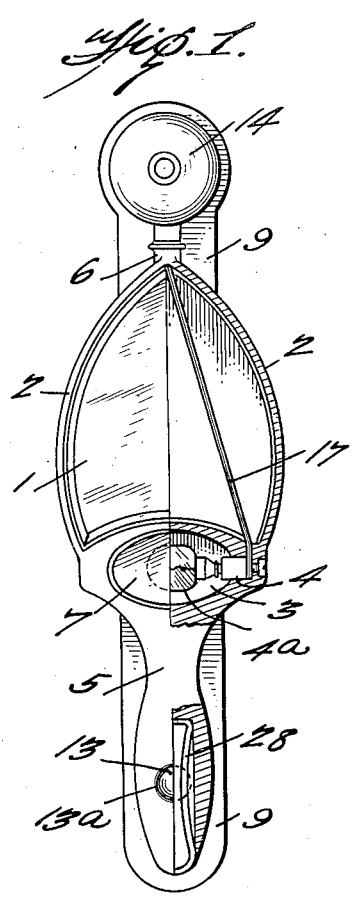
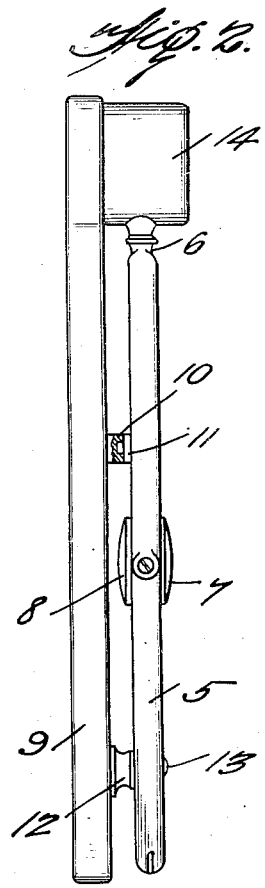
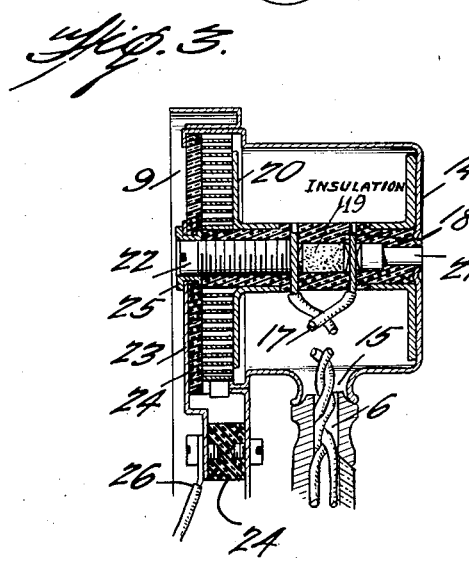
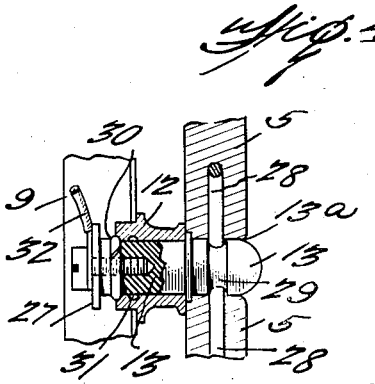
Inventor
CHARLES BROT Patented Jan. 14, 1930

1,743,595

UNITED STATES PATENT OFFICE

CHARLES BROT, OF PARIS, FRANCE

ILLUMINATED MIRROR AND SUPPORT THEREFOR

Application filed November 30, 1928, Serial No. 322,803, and in France January 23, 1928.

This invention relates to hand mirrors which are provided with an electric lamp to illuminate the user of the mirror and has for its object means by which the lamp may be lit when the mirror is taken from its holding device or supporting bracket and will be extinguished when replaced therein. Mirrors of this kind are desirable for the furnishings of automobiles, railway cars and dressing rooms.

Reference is made to the accompanying drawings forming part of this application.

Figure 1 shows a mirror embodying my invention, in elevation and partly in section.

Figure 2 is a side elevation of the mirror shown in Figure 1.

Figure 3 is an enlarged vertical section of the upper portions of the mirror and its wall bracket, and Figure 4 is an enlarged vertical section of the lower portions of the mirror frame and wall bracket.

2 is the frame of the mirror 1, having a cavity 3, a lower handle 5, and a head 6. An electric lamp $4^a$, mounted in a socket 4, is contained within the cavity 3 which is glazed preferably by ground glass 7. The back of the cavity is closed by a cover 8 preferably of the same appearance as the material making up the mirror frame 2. The handle 5 has a perforation $13^a$ therein from front to back, across which projects a spring 28. 9 is a metallic wall bracket to support the mirror, when not in use. It has at its top on its outer face a cylindrical housing 14, containing a spring reel 20, the hub 18 of which is preferably of insulating material. The housing has on its bottom a socket 15 adapted to receive the head 6 of the mirror frame. The bracket has on its bottom a boss 12 in which slides an insulating stud 13 surrounded by a split spring ring 30, located in a circumferential groove therein. The stud 13 has on its rear end a washer 27, and the boss has an integral annular groove 31 adapted, as will be described, to receive at times the split ring 30. The stud has also, near its outer end, a circumferential groove 29 adapted, as will be described, to be engaged by the spring 28.

The lamp $4^a$ is supplied with current by flexible wires 17 passing out of the mirror frame at the head 6 and into the housing 14 where they are wound on the spring reel 20, their ends being fast in the hub of the latter, where they are separated by an insulating block 19. One wire is in electrical connection with the pin 21 and through it with the metallic frame of the bracket. The other wire is in electrical connection with the screw 22, the hub bearing 25, and through it with the conducting strip 23 and electrical feed conductor 26, such strip and conductor being insulated from the bracket by the insulating blocks 24. The other feed conductor 32 is connected with the washer 27 on the stud 13.

When the mirror is not in use it is carried by the bracket as shown, the head 6 being in the socket 15, and the stud 13 projecting through the opening $13^a$ in the mirror frame, the parts being held in this position by the spring 28. At this time the circuit of the lamp will be broken because the washer 27 is removed from contact with the boss 12. A lug 10, having an elastic head 11 may be placed on the front of the bracket intermediate of its length to afford an additional support for the mirror frame. When it is desired to use the mirror the mirror frame is pulled away from its bracket. In so doing the spring 28 will draw the stud 13 outwardly in the boss 12, until arrested by the washer 27 contacting with the rear of the boss which will close the circuit between the conductor 32 and the metallic bracket, and thus the circuit of the lamp. Continued movement of the mirror frame will then snap the spring 28 out of the groove 29, leaving the mirror frame free, while the stud will be locked in the position at which it has been shifted by the fact that the split ring 30 is now in the groove 31.

Upon replacing the mirror frame on the bracket the stud will be shoved inwardly in the boss and the parts restored to the position shown in Fig. 4.

What I claim is:

1. The combination with a wall bracket of a combined mirror and lamp frame, a shiftable clutch member for supporting the frame from the bracket, said member comprising a sliding stud having resilient locks with the bracket and with the frame, and a contact member closing the circuit of the lamp when the stud is resiliently clamped to the bracket.

2. The combination with a wall bracket having a spring reel at the head thereof, a stud slidingly mounted in the base of the bracket, resilient means to lock the stud and the bracket together, a combined mirror and lamp frame, conductors from the lamp wound upon the reel, a stop upon the stud, the circuit of the lamp including the said stop and the bracket, and a resilient member adapted to engage the stud and to shift it inwardly to break the circuit of the lamp when the frame is on the said bracket, and to shift the stud outwardly to close the circuit and to resiliently engage the stud and the bracket, upon the removal of the frame from the bracket.

CHARLES BROT.